US008212817B2

(12) United States Patent
Hao et al.

(10) Patent No.: US 8,212,817 B2
(45) Date of Patent: Jul. 3, 2012

(54) SPATIAL TEMPORAL VISUAL ANALYSIS OF THERMAL DATA

(75) Inventors: Ming C. Hao, Palo Alto, CA (US); Umeshwar Dayal, Saratoga, CA (US); Ratnesh Kumar Sharma, Fremont, CA (US); Chandrakat Patel, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 845 days.

(21) Appl. No.: 12/290,616

(22) Filed: Oct. 31, 2008

(65) Prior Publication Data

US 2010/0110076 A1 May 6, 2010

(51) Int. Cl.
*G06T 11/20* (2006.01)

(52) U.S. Cl. ........................................ 345/440; 345/650

(58) Field of Classification Search .................. 345/440, 345/650
See application file for complete search history.

(56) References Cited

U.S. PATENT DOCUMENTS

2007/0032979 A1* 2/2007 Hamann et al. ............... 702/130
2009/0077558 A1* 3/2009 Arakawa et al. .............. 718/102
2010/0057259 A1* 3/2010 Dawson et al. ............... 700/278

* cited by examiner

*Primary Examiner* — Maurice L McDowell, Jr.

(57) ABSTRACT

Systems, methods, and other embodiments associated with spatial temporal visual analysis of thermal data are described. One example system includes recording a set of temperature data including multiple dimensions of data from a set of sensors attached to racks of computers in a data center. The example system also includes displaying the multiple dimensions of data in a two dimension graphic. The example system also includes performing spatial temporal visual analysis techniques to correlate temperature states, discover thermal exceptions, and so on, in the graphic.

17 Claims, 9 Drawing Sheets

900

SPATIAL TEMPORAL VISUAL ANALYSIS OF THERMAL DATA

BACKGROUND

Businesses provide services that require a large amount of computing resources at some point in the development or provision of the service. For example, a computer animation company may distribute rendering processing load to a number of computers to produce animations quickly. In another example, an online sales company may distribute incoming requests to a large number of computers acting as web servers to handle a larger traffic load than can be handled by a single computer. Typically, when a business utilizes a large number of computers for load distribution solutions, the computers are stored on racks in a data center. A conventional data center is a room, a floor, or sometimes even an entire building dedicated to housing computing systems configured to perform specific tasks.

One specific concern when designing a data center is heat management. As computers give off heat while operating, a data center may become hot if many computers are operating at the same time. Too much heat can lead to premature system failure. This may create undesirable costs for businesses including loss of revenue due to downtime and increased system repair expenses. Conventional data center thermal monitoring systems may utilize a sparse set of sensors spread throughout a data center. However, typical systems are often too sparse to accurately track heat data in specific areas of a data center. Thus, conventional systems may rely on exception reporting from the machines themselves to determine when heat is exceeding a prescribed threshold. However, at this point, it may be too late to take steps to prevent system failure and incur an undesirable cost. One reason why a data center may have a sparse array of sensors may be due to the difficulty in visually analyzing a large number of sensors in a data center simultaneously over a large period of time. See, for example, FIG. 9. FIG. 9 illustrates how a line graph 900 that tracks a large number of sensors may make it difficult to determine relationships between related sensors.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
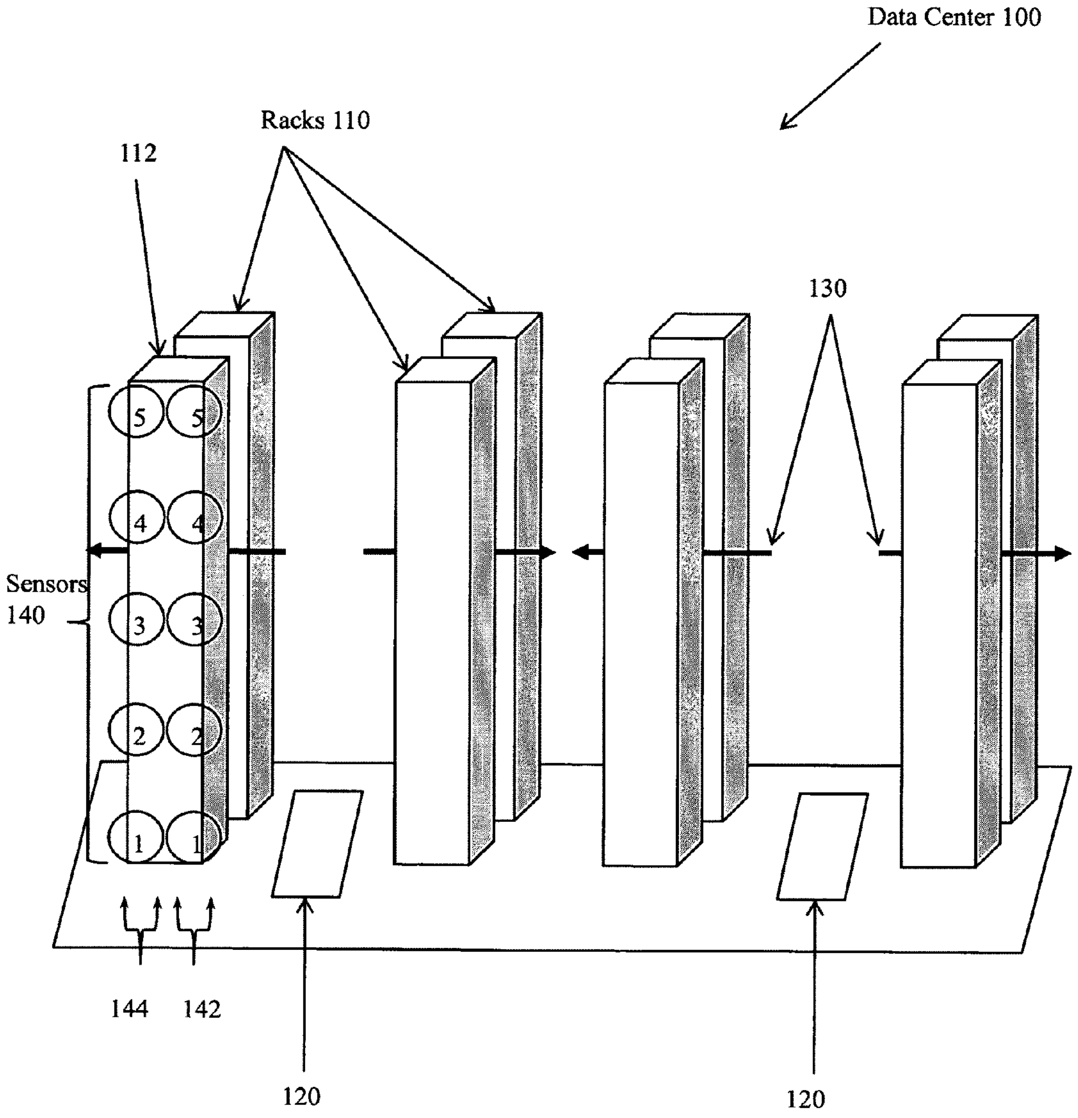
FIG. 1 illustrates one embodiment of an example data center.

Example systems and methods associated with spatial temporal visual analysis of thermal data are described. One example method includes storing temperature data received from a set of sensors in a data center. For example, FIG. 1 illustrates an example data center 100. Data center 100 includes several racks 110 containing computers. Data center 100 also includes several air vents 120 to provide cooling air to the computers on the racks 110. Air flow lines 130 show how cooling air from the air vents 120 may move through the racks 110 of computers. In one example, a set of sensors 140 may be attached to a rack 112 to monitor air temperature as it passes through rack 112. In one example, the set of sensors 140 may be attached to rack 112 at varying heights (1-5). In another example, the set of sensors 140 may be arranged in pairs on rack 112 of computers. Thus, a first group of sensors 142 may record air temperature data before the air passes through rack 112 and a second group of sensors 144 may record air temperature data after the air has passed through rack 112. Sensors may be affixed to several of the racks 110 in data center 100 in a manner similar to that of rack 112. This may provide detailed temperature data for a portion of data center 100. Thus, a recorded temperature value may be associated with an X position in the data center, a Y position in the data center, a Z position in the data center, inlet/outlet properties, and a time, yielding multiple dimensions of data.

Figure 2:
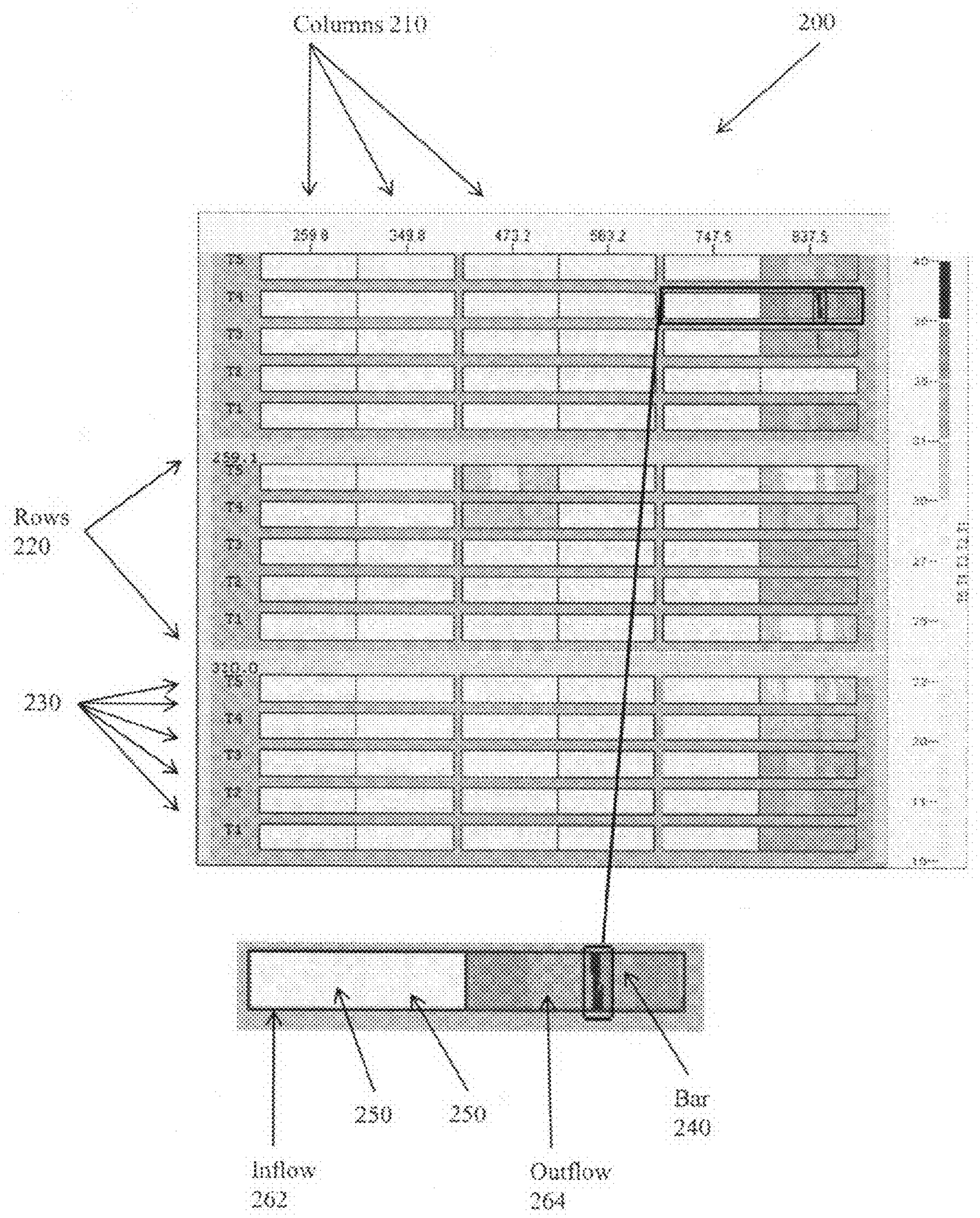
FIG. 2 illustrates an example graphic associated with spatial temporal visual analysis of thermal data.

The example method also includes displaying the multiple dimensions of data from the sensors in a two dimension graphic. The graphic may be displayed, for example, at a monitoring station outside of the data center. FIG. 2 illustrates one example arrangement of the multiple dimensions of data in a two dimension graphic 200. In this example, temperature values associated with sensors sharing X positions may share columns 210 in the two dimension graphic 200. Temperature values associated with sensors sharing Y positions may share rows 220 in the two dimension graphic 200. Temperature values associated with sensors sharing Y positions and Z positions may share sub-rows 230 in the two dimension graphic 200. Temperature values associated with a sensor may be arranged in a bar 240 in chronological order. Temperature values themselves may be represented by varying colors and/or grayscales as illustrated in region 250. Two dimension graphic 200 also illustrates how air flow in a data center may be represented. Borders 262 and 264 may have different colors and/or grayscales to differentiate between sensors measuring air flowing into a rack of computers and sensors measuring air flowing out of a rack of computers. In this example, a first color on border 264 indicates a sensor monitoring air flowing into a rack and a second color on border 262 indicates a sensor monitoring air flowing out of a rack. Thus, temperatures can be visibly tracked as air flows through a data center. One with ordinary skill in the art can see how other arrangements of graphical features can be used to convey multiple dimensions of temperature data in a two dimension graphic.

Thus, two dimension graphic 200 displays a spatial temporal multi-dimensional visualization with physical locations, time series data, temperature sensor data, and so on. This may allow more accurate real time monitoring of heat patterns in the data center. Further, monitoring and storing temperature data in this manner may provide the unexpected utility of allowing data queries that aid in precisely identifying, diagnosing, and treating causes of heat anomalies that are detected. FIG. 2 illustrates one example layout of multi-dimensional thermal data in a two dimensional figure. The layout illustrates how a set of thermal time series may be organized based on rack location. Thermal data may be organized in a top down view of racks in a datacenter, where racks contain several sensors. This allows a user to interact with the graphical data by, for example, selecting a sensor or a portion of a time series for analysis. In one example, hot spots may be marked for thermal correlation analysis and root-cause queries.

Figure 8:
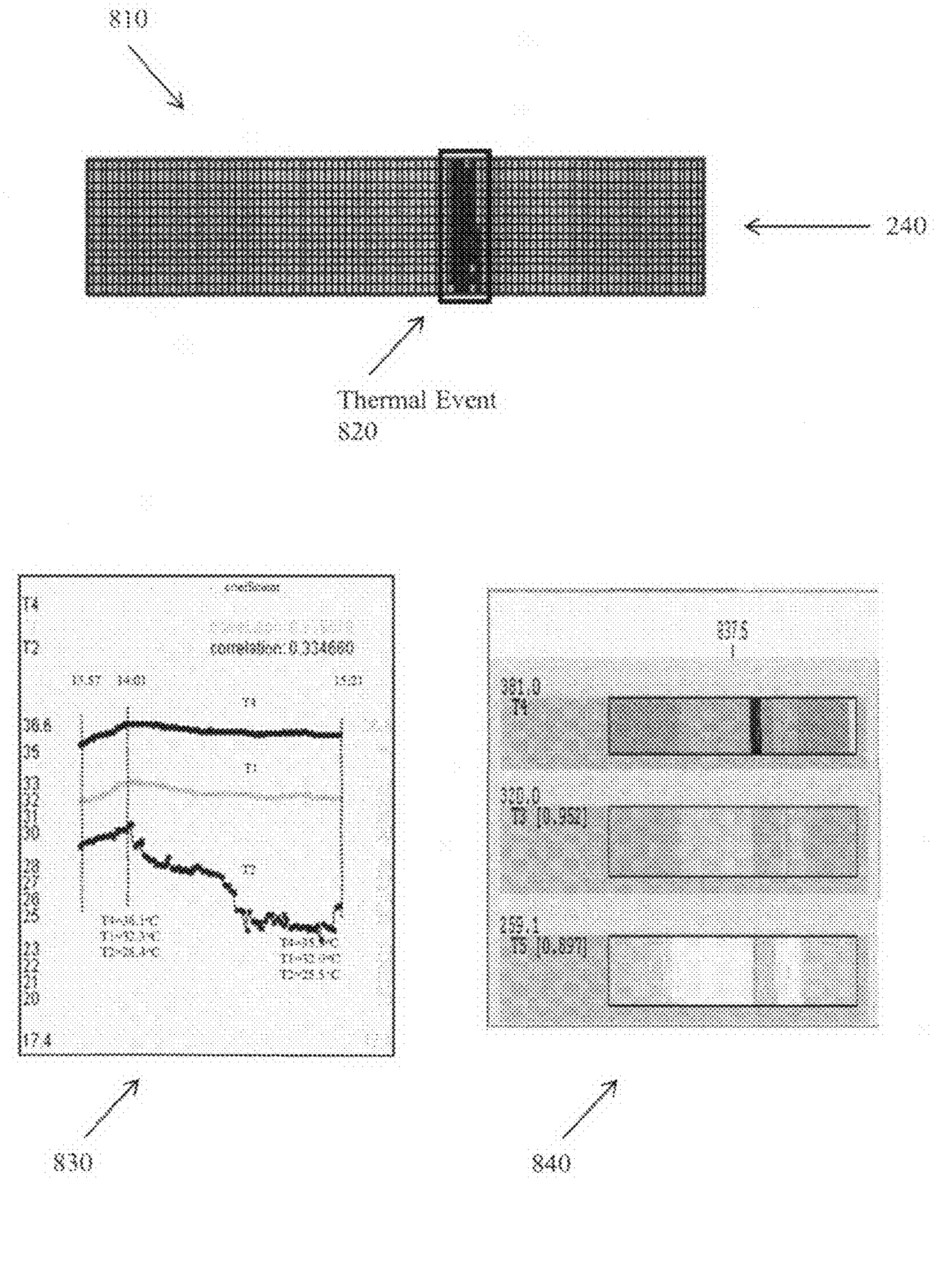
FIG. 8 illustrates an example graphic associated with spatial temporal visual analysis of thermal data within a rack.
Figure 9:
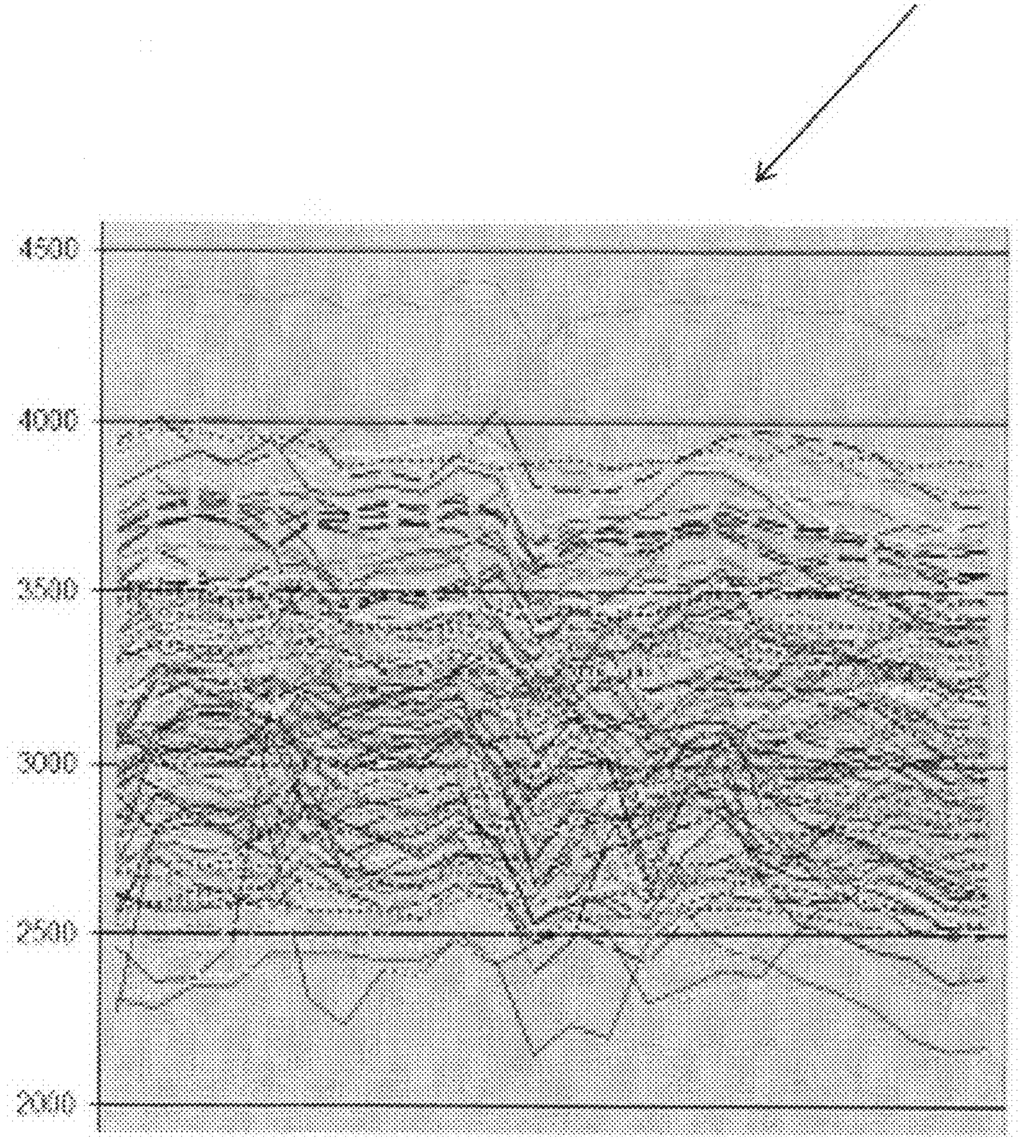
FIG. 9 illustrates an example graphic associated with spatial temporal visual analysis of thermal data across a rack.

FIG. 8 illustrates an example output provided in response to a data query. In one example, the query may be a visual analytic query. The data query may be a correlation query seeking data describing a probability of a relationship existing between temperatures recorded at multiple sensors. Graphic 810 illustrates a more precise example of how temperature values may be arranged in a bar 240 in chronological order. Graphic 810 illustrates a time series of temperature data points recorded by a sensor. Squares in bar 240 represent time points at which a temperature was recorded. Graphic 810 also illustrates a thermal event 820. In one example, thermal event 820 may be selected on a graphical user interface by a user. Upon this selection, a correlation logic may determine if any nearby sensors experience related heat patterns. Thus, upon selecting thermal event 820 the correlation logic may display graphics including graphic 830 to show the sensor's correlation within a rack and graphic 840 to show the sensor's correlation across racks. In 830, the line chart shows the selected sensor T4 has a high correlation with T1 but not T2 because T4 and T1 temperatures change at same pace. T2's temperature drops after 14:01. This is caused by either a change in air flow or workload in the servers around T2. The Administrator needs to make a correction on T2. In 840, the sensor T3 at locations (837.5,320.0) and sensor T5 at location (837.5, 259.1) have high correlations with the sensor T4 at location (837.5, 381.0). This correlation information helps the administrator to identify the period of interest for the diagnosis of the thermal events across the racks. For example, graphic 830 and/or graphic 840 may display probabilities of relationships existing between the selected sensor and another sensor(s) that the logic determined were related to the selected sensor. The real time spatial temporal visual analysis of heat patterns and precision analysis of heat anomalies may reduce the total cost of ownership of a data center by lengthening computer system life expectancy, increasing energy efficiency, and reducing the chance of temperature related system failure.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.

CD: compact disk.

CD-R: CD recordable.

CD-RW: CD rewriteable.

DVD: digital versatile disk and/or digital video disk.

HTTP: hypertext transfer protocol.

LAN: local area network.

PCI: peripheral component interconnect.

PCIE: PCI express.

RAM: random access memory.

DRAM: dynamic RAM.

SRAM: synchronous RAM.

ROM: read only memory.

PROM: programmable ROM.

SQL: structured query language.

OQL: object query language.

USB: universal serial bus.

XML: extensible markup language.

WAN: wide area network.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data. A data store may be, for example, a database, a table, a file, a data structure (e.g. a list, a queue, a heap, a tree) a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Query", as used herein, refers to a semantic construction that facilitates gathering and processing information. A query may be formulated in a database query language (e.g., SQL), an OQL, a natural language, and so on.

"Signal", as used herein, includes but is not limited to, electrical signals, optical signals, analog signals, digital signals, data, computer instructions, processor instructions, messages, a bit, a bit stream, and so on, that can be received, transmitted and/or detected.

"Software", as used herein, includes but is not limited to, one or more executable instruction that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, logics, computers or other devices, or combinations of these.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is to be appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 3:
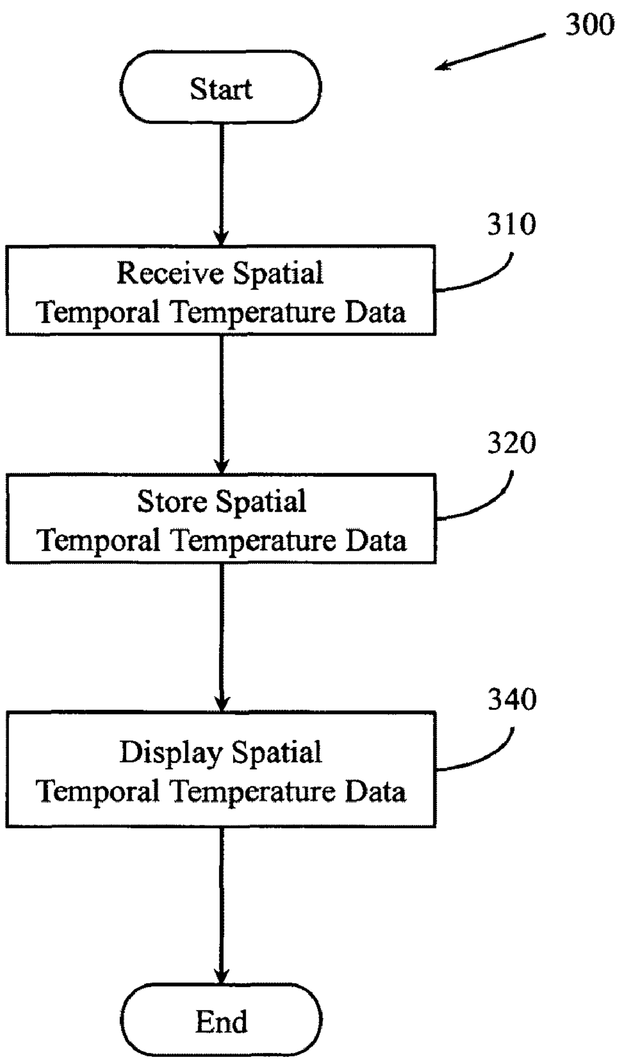
FIG. 3 illustrates one embodiment of an example method associated with spatial temporal visual analysis of thermal data for sensor temperature distribution, patterns, trends, and exceptions.

FIG. 3 illustrates a method 300 associated with spatial temporal visual analysis of thermal data. Method 300 includes, at 310, receiving a set of temperature data from a set of sensors. While "temperature data" is described, more generally "spatial temporal temperature data" or "thermal data" may be received. "Spatial temporal temperature data" may be characterized as a set of time series associated with a set of sensors arranged in a three dimensional space. The set of sensors may be positioned in a fixed arrangement. In one example, members of the set of sensors may be attached to racks of computers in a data center (see FIG. 1). The set of temperature data may be received over a period of time. Thus, the set of temperature data may be a time series. Method 300 also includes, at 320, storing the set of temperature data in a data store. The data store may be, for example, a database, a table, an array, a linked list, and so on.

Method 300 also includes, at 340, displaying a subset of the set of temperature data in a two dimension graphic on a computer display. The computer display may be located at a monitoring station that is external to the data center. Members of the subset of the set of temperature data associated with sensors having a common position on a first axis associated with the fixed arrangement may be geometrically related in a first direction in the two dimension graphic. The first direction may be horizontally in the graphic. Members of the subset of the set of temperature data associated with sensors having a common position on a second axis associated with the fixed arrangement may be geometrically related in a second direction in the two dimension graphic. The second direction may be vertically in the graphic. Members of the subset of the set of temperature data associated with sensors having a common position on the second axis and having a common position on a third axis associated with the fixed arrangement may be geometrically related in a subdivision of the second direction in the two dimension graphic. Members of the subset of the set of temperature data associated with a sensor may be arranged chronologically. In one example, a set of temperature data associated with a sensor may be arranged chronologically from left to right. In this example, the leftmost bottom position in the graphic may be associated with an earliest member of the set of temperature data associated with the sensor. The rightmost top position in the graphic may be associated with a latest member of the set of temperature data associated with the sensor. A value associated with a member of the set of temperature data may be represented in the two dimension graphic by a color scale from low temperature (green) to medium (yellow), and to high (red).

While FIG. 3 illustrates various actions occurring in serial, it is to be appreciated that various actions illustrated in. FIG. 3 could occur substantially in parallel. By way of illustration, a first process could receive temperature data, a second process could store temperature data, and a third process could display temperature data. While three processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform a method. While executable instructions associated with the above method are described as being stored on a computer-readable medium, it is to be appreciated that executable instructions associated with other example methods described herein may also be stored on a computer-readable medium.

Figure 4:
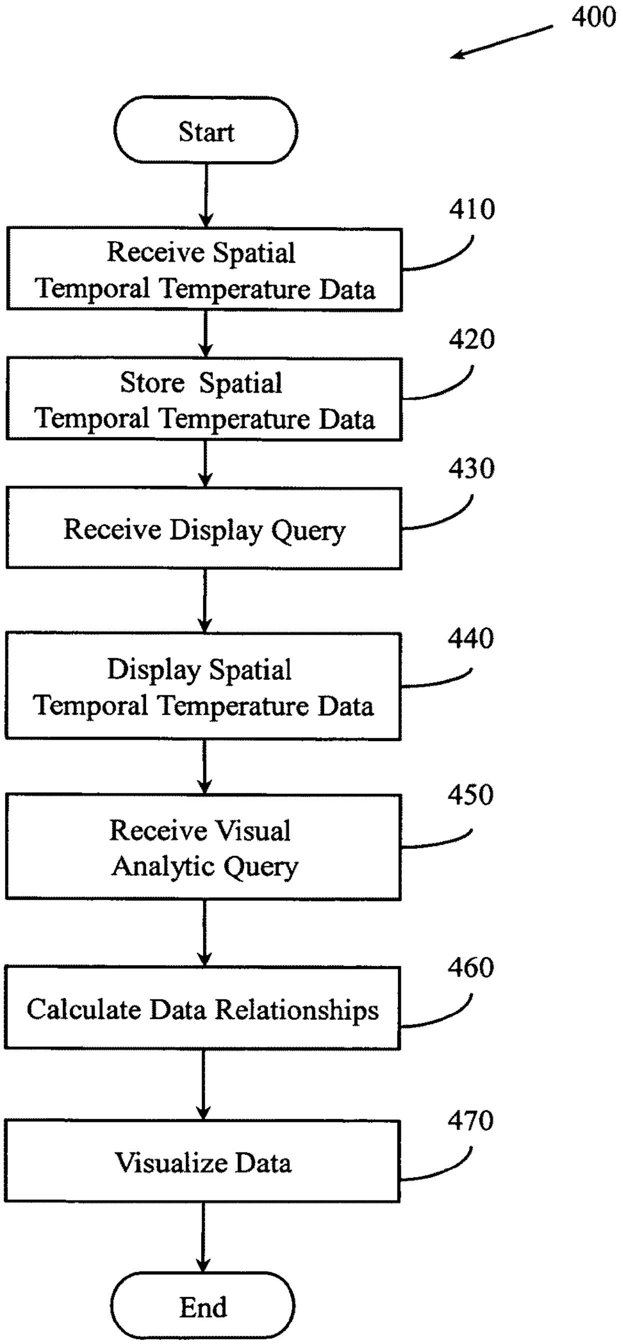
FIG. 4 illustrates one embodiment of an example method associated with spatial temporal visual analysis query of thermal data for sensor temperature relationships within and across a rack.

FIG. 4 illustrates a method 400 associated with spatial temporal visual analysis of thermal data. Method 400 includes several actions similar to those described in connection with method 300 (FIG. 3). For example, method 400 includes receiving temperature data at 410, storing temperature data at 420, and displaying temperature data at 440. However, method 400 includes additional actions.

Method 400 includes, at 430, receiving a display query. The display query may identify a set of requested temperature data associated with selected members of the set of sensors. The set of sensors may be located in a single rack and/or in different racks. Thus, displaying temperature data at 440 may be performed in response to receiving the display query. The display query may be received from a querying agent. The query agent may be one of, an Administrator, a logic, and so on. The display query may identify a subset of the sensors and a time period regarding which the querying agent desires temperature data. An example graphic produced in response to the query is presented in FIG. 2.

Method 400 also includes, at 450, receiving a visual analytic query. The visual analytic query may seek a probability of a relationship existing between multiple subsets of the set of temperature data. For example, the visual analytic query may seek a sensor that is determined to be a most closely related sensor to a selected sensor. The visual analytic query may also seek information regarding sensors surrounding a selected sensor. The visual analytic query may be received from a querying agent. In one example, the querying agent may be a user. Thus, the visual analytic query may be generated by a user selecting a portion of the two dimension graphic. In one example, the user may select a portion of the two dimension graphic by drawing a selection rectangle over a desired portion. The visual analytic query may identify a first sensor, a second sensor, and a time period. Method 400 also includes, at 460, calculating a set of correlation data. Calculating the set of correlation data may include computing a probability of a relationship existing between temperature data associated with the first sensor over the time period and temperature data associated with the second sensor over the same time period. The first sensor may be a selected sensor and the second sensor may be a sensor most related to the selected sensor. In one example a relationship may be considered to exist if temperature data associated with the first sensor and temperature data associated with the second sensor exhibit similar temperature values. In another example, a relationship may be considered to exist if temperature data associated with the first sensor and temperature data associated with the second sensor exhibit similar simultaneous changes in temperature. This type of relationship may indicate an overall data center temperature change. In still another example, a relationship may be considered to exist if temperature data associated with the first sensor and temperature data associated with the second sensor exhibit similar changes in temperature on a time delay. This type of relationship may facilitate detecting causal heat relationships in the data center. Method 400 also includes, at 470, providing the set of correlation data. In one example, the set of correlation data may be provided to the querying agent. An example graphical output of correlation data is presented in FIG. 8.

In one example, a marker may automatically identify abnormal data points such as hotspots. This may guide an administrator to anomalies. After locating an anomaly, the administrator may select a marked area using a graphical query. The query may initiate a calculation to determine relationships between attributes associated with the selected data anomaly and attributes associated with sensors near the sensor with which the anomaly is associated. In one example, the query results may be presented in a graphic that allows the administrator to further refine results. This may allow the administrator to determine thermal correlations between the selected sensor and nearby sensors.

By way of illustration, it is possible that a piece of paper may become trapped in a computer in a rack in a data center. Conventional systems with few sensors may not be able to determine that this has occurred until the computer itself has overheated and an exception has been reported. In the lucky event that a sensor has been placed near enough to the computer that a change is detected, a data center administrator may still be unable to determine the specific source of the problem as the sensor would be responsible for detecting general temperatures for a large portion of the data center whereas only one computer is exhibiting abnormal behavior. Multiple sensors spread throughout a data center on a large portion of the racks would show that only computers in the one specific area are having an issue as the two dimension graphic would show that the rest of the data center is operating normally. This would allow the administrator to specifically look for something causing a highly localized heat anomaly. In another example, servers may not be stacked properly in a rack. For example, there may be gaps between servers that lead to mixing of hot and cold air. Example systems and methods may facilitate identifying such improper stacking.

In another example, a portion of a data center's cooling system may fail. While detectable, conventional systems using few sensors may take a significant amount of time to register the change if a sparse array of sensors does not cover the area of the origination of the anomaly. By using a large number of sensors on multiple racks, temperature values may quickly begin to fluctuate and may precisely identify the source of the anomaly as temperatures recorded closer to the failed portion of the cooling system may be higher than those farther away.

Figure 5:
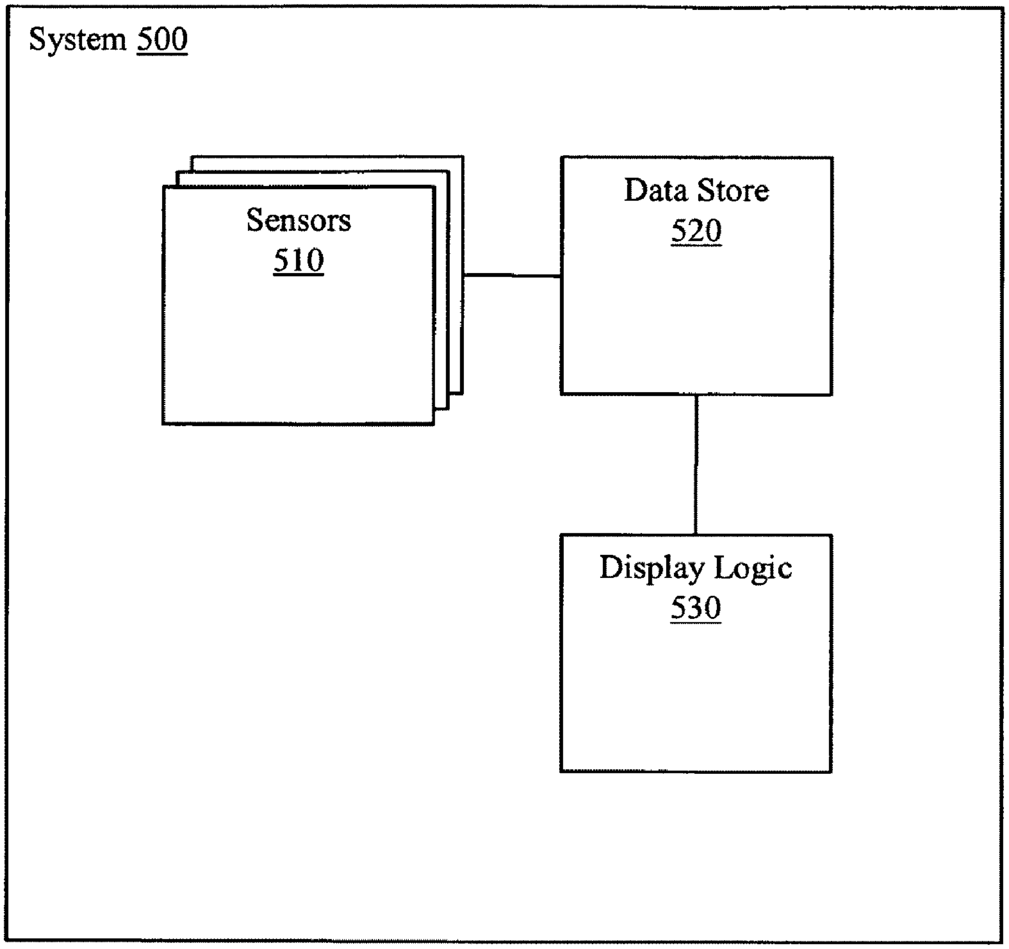
FIG. 5 illustrates one embodiment of an example system associated with spatial temporal visual analysis of thermal data for sensor temperature distribution, patterns, trends, and exceptions.

FIG. 5 illustrates a system 500 associated with spatial temporal visual analysis of thermal data. System 500 includes a set of sensors 510. A member of the set of sensors 510 may be attached to a rack of computers in a data center. Set of sensors 510 may record a set of temperature data. A member of the set of temperature data recorded by a member of the set of sensors 510 may include multiple characteristics. The multiple characteristics may include a temperature, a location on a first dimension of the sensor, a location on a second dimension of the sensor, a location on a third dimension of the sensor, an inlet/outlet identifier, and a time at which the temperature was recorded. System 500 also includes a data store 520. Data store 520 may store the set of temperature data recorded by set of sensors 510.

System 500 may also include a display logic 530. Display logic 530 may display a subset of the set of temperature data as a graphic having two dimensions. Members of the set of temperature data sharing a value of one of the multiple characteristics may share a feature on the two dimension graphic: For example, temperature data associated with sensors sharing a location on the first dimension may share a column in the two dimension graphic, and so on.

Figure 6:
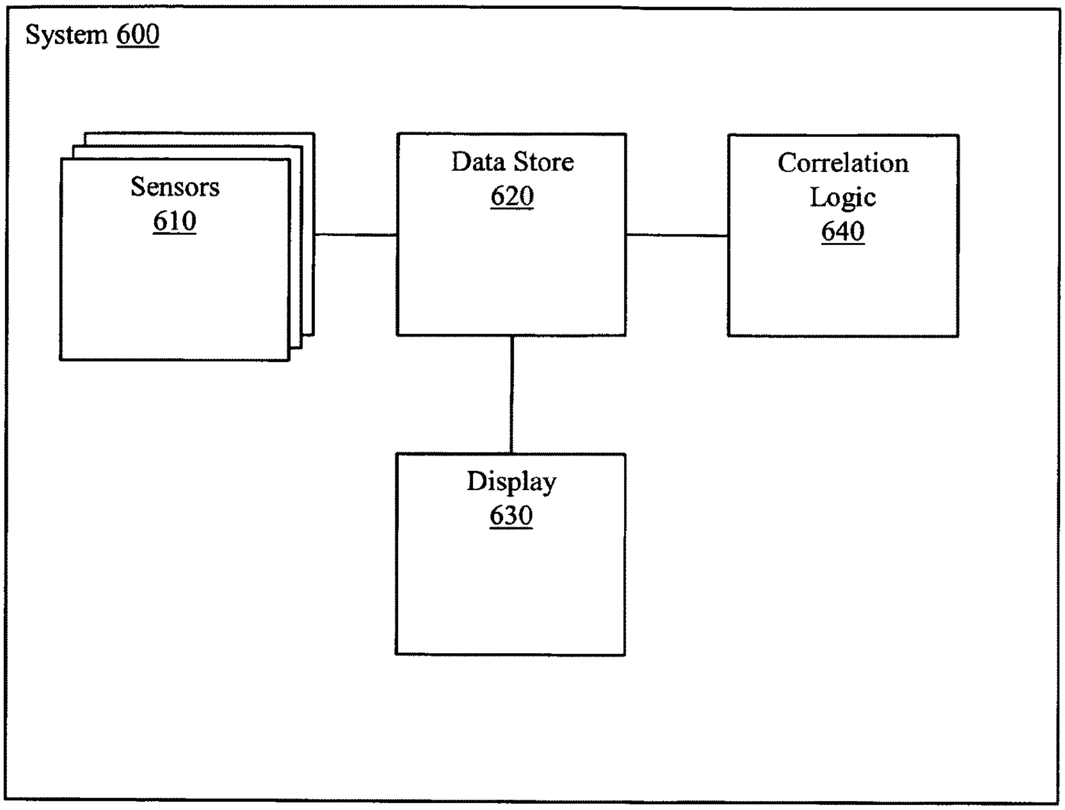
FIG. 6 illustrates one embodiment of an example system associated with spatial temporal visual analysis of thermal data for sensor temperature relationships within and across a rack.

FIG. 6 illustrates a system 600 associated with spatial temporal visual analysis of thermal data. System 600 includes several items similar to those described in connection with system 500 (FIG. 5). For example, system 600 includes a set of sensors 610 to record a set of temperature data, a data store 620 to store the set of temperature data, and a display logic 630 to display a subset of the set of temperature data. However, system 600 includes an additional element.

System 600 includes a correlation logic 640. Correlation logic 640 may calculate a set of correlation data in response to receiving a visual analytic query. The visual analytic query may identify a first member of the set of sensors, a second member of the set of sensors, and a time period. The first sensor may be a selected sensor, and the second sensor may be a sensor most related to the selected sensor. Calculating the set of correlation data may include computing a probability of a relationship existing between temperature data associated with the first sensor over the time period and temperature data associated with the second sensor over the time period. Correlation logic 640 may also provide the set of correlation data. Providing the set of correlation data may include sending a signal, outputting a graphic, changing a value, updating a database, and so on. In addition to indicating correlations, metrics can be displayed and analyzed to identify inefficiencies in data centers.

Figure 7:
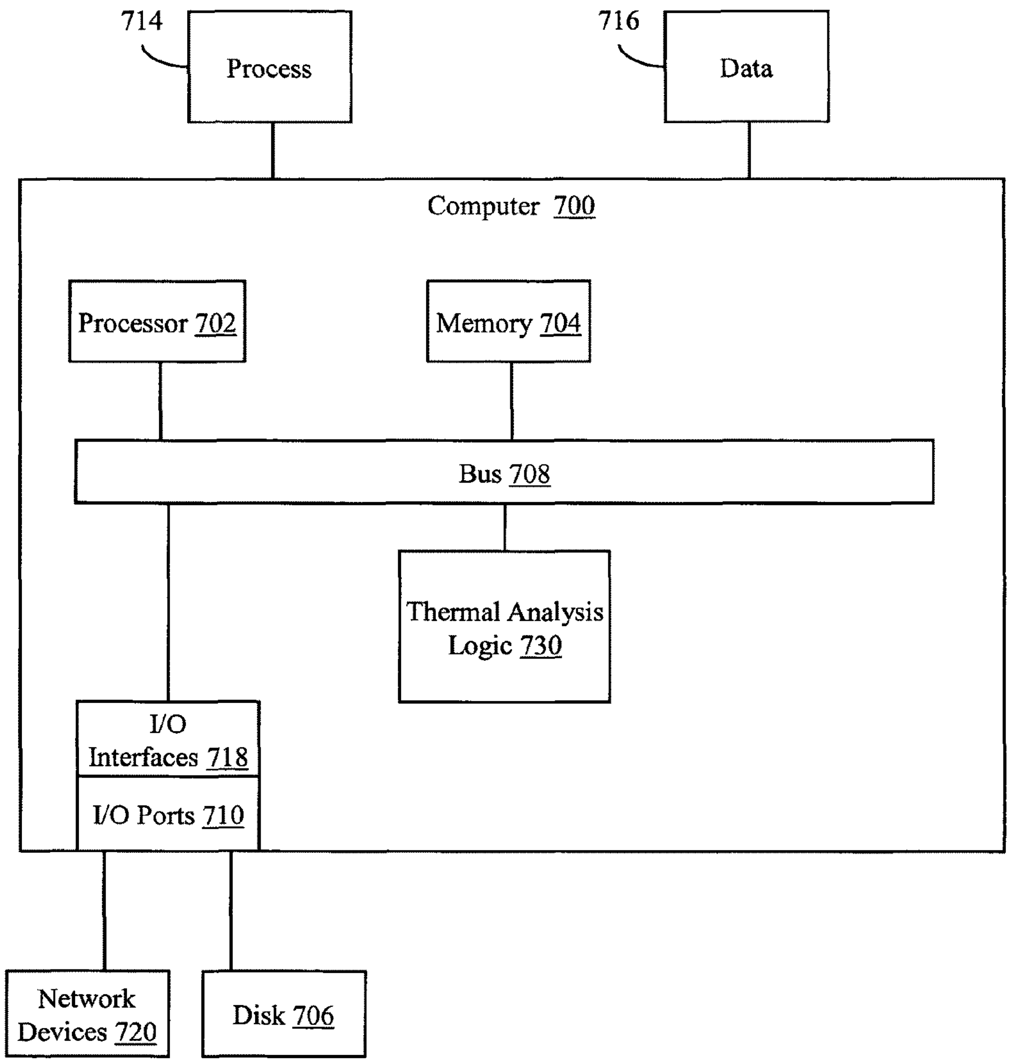
FIG. 7 illustrates an example computing environment in which example systems and methods, and equivalents, may operate.

FIG. 7 illustrates an example computing device in which example systems and methods described herein, and equivalents, may operate. The example computing device may be a computer 700 that includes a processor 702, a memory 704, and input/output ports 710 operably connected by a bus 708. In one example, the computer 700 may include a thermal analysis logic 730. In different examples, the logic 730 may be implemented in hardware, software, firmware, and/or combinations thereof. While the logic 730 is illustrated as a hardware component attached to the bus 708, it is to be appreciated that in one example, the logic 730 could be implemented in the processor 702.

Thus, logic 730 may provide means (e.g., hardware, software, firmware) for recording a set of temperature data from a set of sensors, where the set of temperature data includes three or more dimensions of data. Logic 730 may also provide means (e.g., hardware, software firmware) for displaying a subset of the set of temperature data, where the three or more dimensions of data are arranged on a two dimension display. The means associated with logic 730 may be implemented, for example, as an ASIC. The means may also be implemented as computer executable instructions that are presented to computer 700 as data 716 that are temporarily stored in memory 704 and then executed by processor 702.

Generally describing an example configuration of the computer 700, the processor 702 may be a variety of various processors including dual microprocessor and other multi-processor architectures. A memory 704 may include volatile memory and/or non-volatile memory. Non-volatile memory may include, for example, ROM, PROM, and so on. Volatile memory may include, for example, RAM, SRAM, DRAM, and so on.

A disk 706 may be operably connected to the computer 700 via, for example, an input/output interface (e.g., card, device) 718 and an input/output port 710. The disk 706 may be, for example, a magnetic disk drive, a solid state disk drive, a floppy disk drive, a tape drive, a Zip drive, a flash memory card, a memory stick, and so on. Furthermore, the disk 706 may be a CD-ROM drive, a CD-R drive, a CD-RW drive, a DVD ROM drive, a Blu-Ray drive, an HD-DVD drive, and so on. The memory 704 can store a process 714 and/or a data 716, for example. The disk 706 and/or the memory 704 can store an operating system that controls and allocates resources of the computer 700.

The bus 708 may be a single internal bus interconnect architecture and/or other bus or mesh architectures. While a single bus is illustrated, it is to be appreciated that the computer 700 may communicate with various devices, logics, and peripherals using other busses (e.g., PCIE, 1394, USB, Ethernet). The bus 708 can be types including, for example, a memory bus, a memory controller, a peripheral bus, an external bus, a crossbar switch, and/or a local bus.

The computer 700 may interact with input/output devices via the i/o interfaces 718 and the input/output ports 710. Input/output devices may be, for example, a keyboard, a microphone, a pointing and selection device, cameras, video cards, displays, the disk 706, the network devices 720, and so on. The input/output ports 710 may include, for example, serial ports, parallel ports, and USB ports.

The computer 700 can operate in a network environment and thus may be connected to the network devices 720 via the i/o interfaces 718, and/or the i/o ports 710. Through the network devices 720, the computer 700 may interact with a network. Through the network, the computer 700 may be logically connected to remote computers. Networks with which the computer 700 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term “includes” or “including” is employed in the detailed description or the claims, it is intended to be inclusive in a manner similar to the term “comprising” as that term is interpreted when employed as a transitional word in a claim.

To the extent that the term “or” is employed in the detailed description or claims (e.g., A or B) it is intended to mean “A or B or both”. When the applicants intend to indicate “only A or B but not both” then the term “only A or B but not both” will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, ABC, AAA, AAB, AABB, AABBC, AABBCC, and so on (e.g., the data store may store only A, only B, only C, A&B, A&C, B&C, A&B&C, A&A&A, A&A&B, A&A&B&B, A&A&B&B&C, A&A&B&B&C&C, and so on). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A system, comprising:

a set of sensors to record a set of thermal data, where a member of the set of thermal data recorded by a member of the set of sensors includes a set of characteristics, the set of characteristics including:

a temperature, a location on a first dimension of the sensor, a location on a second dimension of the sensor, a location on a third dimension of the sensor, and a time at which the temperature was recorded;

a data store to store the set of thermal data;

a display logic to display a subset of the set of thermal data as a two dimension graphic for spatial temporal visual analysis of the thermal data, where members of the subset of the set of thermal data sharing a value of one of the set of characteristics share a feature on the two dimension graphic; and a correlation logic to:

calculate a set of correlation data in response to receiving a visual analytic query; and provide the set of correlation data.

2. The system of claim 1, where a member of the set of sensors is attached to a rack of computers in a data center.

3. The system of claim 1, where the visual analytic query identifies a first member of the set of sensors, a second member of the set of sensors, and a time period, and where calculating the set of correlation data includes computing a probability of a relationship existing between thermal data associated with the first sensor over the time period and thermal data associated with the second sensor over the time period, where the first sensor is a selected sensor, and where the second sensor is a sensor related to the selected sensor.

4. The system of claim 1, wherein the display logic is to assign different colors to different members of the subset in the two dimension graphic for respective different temperature values.

5. A non-transitory computer-readable medium storing computer-executable instructions that when executed by a computer cause the computer to perform a method, the method comprising:

receiving a set of temperature data over a period of time from a set of sensors positioned in a particular arrangement;

displaying a subset of the set of temperature data in a two dimension graphic on a computer display, where members of the subset of the set of temperature data associated with sensors having a common position on a first axis associated with the particular arrangement are geometrically related in a first direction in the two dimension graphic, where members of the subset of the set of temperature data associated with sensors having a common position on a second axis are geometrically related in a second direction associated with the particular arrangement in the two dimension graphic, the second direction being different from the first direction, where members of the subset of the set of temperature data associated with sensors having a common position on the second axis and having a common position on a third axis associated with the particular arrangement are geometrically related in a subdivision of the second direction in the two dimension graphic, where members of the subset of the set of temperature data associated with a sensor are arranged chronologically, where the displaying is in response to receiving a display query identifying a set of requested temperature data associated with selected members of the set of sensors, and where the display query is received from a querying agent and where the querying agent is one of a user and a logic.

6. The non-transitory computer-readable medium of claim 5, where the set of temperature data is a time series.

7. The non-transitory computer-readable medium of claim 5, where the display query identifies a subset of the set of sensors and a time period regarding which the querying agent desires temperature data.

8. The non-transitory computer-readable medium of claim 5, wherein the displaying further comprises assigning different colors to different members of the subset in the two dimension graphic corresponding to different temperature values.

9. A non-transitory computer-readable medium storing computer-executable instructions that when executed by a computer cause the computer to perform a method, the method comprising:

receiving a set of temperature data over a period of time from a set of sensors positioned in a particular arrangement;

displaying a subset of the set of temperature data in a two dimension graphic on a computer display, where members of the subset of the set of temperature data associated with sensors having a common position on a first axis associated with the particular arrangement are geometrically related in a first direction in the two dimension graphic, where members of the subset of the set of temperature data associated with sensors having a common position on a second axis are geometrically related in a second direction associated with the particular arrangement in the two dimension graphic, the second direction being different from the first direction, where members of the subset of the set of temperature data associated with sensors having a common position on the second axis and having a common position on a third axis associated with the particular arrangement are geometrically related in a subdivision of the second direction in the two dimension graphic, where a set of temperature data associated with a given sensor is arranged chronologically from left to right and bottom to top, the leftmost bottom position in the graphic being associated with an earliest member of the set of temperature data associated with the given sensor and the rightmost top position in the graphic being associated with a latest member of the set of temperature data associated with the given sensor.

10. A non-transitory computer-readable medium storing computer-executable instructions that when executed by a computer cause the computer to perform a method, the method comprising:

receiving a set of temperature data over a period of time from a set of sensors positioned in a particular arrangement;

displaying a subset of the set of temperature data in a two dimension graphic on a computer display, where members of the subset of the set of temperature data associated with sensors having a common position on a first axis associated with the particular arrangement are geometrically related in a first direction in the two dimension graphic, where members of the subset of the set of temperature data associated with sensors having a common position on a second axis are geometrically related in a second direction associated with the particular arrangement in the two dimension graphic, the second direction being different from the first direction, where members of the subset of the set of temperature data associated with sensors having a common position on the second axis and having a common position on a third axis associated with the particular arrangement are geometrically related in a subdivision of the second direction in the two dimension graphic, where members of the subset of the set of temperature data associated with a sensor are arranged chronologically; and in response to receiving a visual analytic query:

calculating a set of correlation data; and providing the set of correlation data, where the visual analytic query seeks identification of a relationship existing between two or more subsets of the set of temperature data.

11. The non-transitory computer-readable medium of claim 10, where the visual analytic query is received from a querying agent, and where the correlation data is provided to the querying agent.

12. The non-transitory computer-readable medium of claim 11, where the visual analytic query is generated by a user selecting one of a sensor temperature threshold and a temperature criteria by drawing a selection rectangle over a target portion.

13. The non-transitory computer-readable medium of claim 10, where the visual analytic query identifies a first sensor, a second sensor, and a time period.

14. The non-transitory computer-readable medium of claim 13, where calculating the set of correlation data includes computing a probability of a relationship existing between temperature data associated with the first sensor over the time period and temperature data associated with the second sensor over the time period.

15. A method comprising:

receiving a set of data acquired by a set of sensors over a period of time, where the set of sensors is in a particular arrangement;

displaying, by a computer, a subset of the set of data in a two dimension graphic, where members of the subset of data having a common position on a first axis associated with the particular arrangement are geometrically related in a first direction in the two dimension graphic, and where members of the subset of data associated with sensors having a common position on a second axis are geometrically related in a second direction associated with the particular arrangement in the two dimension graphic, the second direction being different from the first direction;

receiving a visual analytic query;

in response to the visual analytic query, calculating a set of correlation data and providing the set of correlation data.

16. The method of claim 15, wherein the correlation data indicates a relationship between data associated with a first sensor over a time period and data associated with a second sensor over the time period.

17. The method of claim 15, further comprising assigning different colors to represent different values of the subset of data in the two dimension graphic.

* * * * *